United States Patent Office.

JOHN J. MILLS AND WILLIAM PERRY, OF FREDERICK'S HALL, VIRGINIA.

Letters Patent No. 108,811, dated November 1, 1870.

IMPROVEMENT IN MEDICINE OR PAIN REMEDY.

The Schedule referred to in these Letters Patent and making part of the same.

*To all whom it may concern:*

Be it known that we, JOHN J. MILLS and WILLIAM PERRY, in the county of Louisa, State of Virginia, have invented a certain Process for Making Medicine, of which the following is a specification.

To prepare the medicine, take a quarter of a pound of root of star-grass, quarter of a pound of pipsissewa root and top, quarter of a pound of pleurisy root, quarter of a pound of blood-root, or puccoon; mix the whole in a quart of water and boil it down to eight ounces, then strain it and add four ounces spirits turpentine, half ounce gum-camphor, one ounce alcohol, quarter ounce laudanum, two and a quarter ounces lye soap, and then mix the whole in bottles.

What we claim as our invention, and desire to secure by Letters Patent, is—

The medical compound composed of the ingredients in the proportions specified.

In testimony that we claim the above invention, we have hereunto subscribed our names in the presence of two witnesses.

JOHN J. MILLS.
WILLIAM PERRY.

Witnesses:
CHARLES W. YOUNG,
LEWIS SMITH.